(12) United States Patent
Kobilarov et al.

(10) Patent No.: US 12,116,017 B1
(45) Date of Patent: Oct. 15, 2024

(54) MACHINE-LEARNED COMPONENT HYBRID TRAINING AND ASSISTANCE OF VEHICLE TRAJECTORY GENERATION

(71) Applicant: Zoox, Inc., Foster City, CA (US)

(72) Inventors: Marin Kobilarov, Baltimore, MD (US); Gary Linscott, Seattle, WA (US)

(73) Assignee: Zoox, Inc., Foster City, CA (US)

( * ) Notice: Subject to any disclaimer, the term of this patent is extended or adjusted under 35 U.S.C. 154(b) by 396 days.

(21) Appl. No.: 17/539,191

(22) Filed: Nov. 30, 2021

(51) Int. Cl.
*B60W 60/00* (2020.01)
*G06N 20/00* (2019.01)
*G06V 20/58* (2022.01)

(52) U.S. Cl.
CPC .. *B60W 60/00276* (2020.02); *B60W 60/0011* (2020.02); *G06N 20/00* (2019.01); *G06V 20/58* (2022.01); *B60W 2720/103* (2013.01)

(58) Field of Classification Search
CPC ....... B60W 60/00276; B60W 60/0011; B60W 2720/103; G06N 20/00; G06V 20/58
See application file for complete search history.

(56) References Cited

U.S. PATENT DOCUMENTS

| | | | |
|---|---|---|---|
| 10,133,275 B1 * | 11/2018 | Kobilarov | G06N 3/08 |
| 11,195,418 B1 * | 12/2021 | Hong | B60W 30/18159 |
| 11,380,108 B1 * | 7/2022 | Cai | G06N 5/04 |
| 11,810,365 B1 * | 11/2023 | Crego | G06V 20/70 |
| 2018/0150081 A1 * | 5/2018 | Gross | G05D 1/0217 |
| 2019/0178988 A1 * | 6/2019 | England | G06F 18/24143 |
| 2020/0050536 A1 * | 2/2020 | Nygaard | G06F 11/3684 |
| 2020/0189573 A1 * | 6/2020 | King | G06V 20/58 |
| 2020/0356900 A1 * | 11/2020 | Briancon | G06N 20/20 |
| 2020/0377085 A1 * | 12/2020 | Floyd-Jones | B60W 30/09 |
| 2021/0001843 A1 * | 1/2021 | Pan | G08G 1/167 |
| 2021/0046924 A1 * | 2/2021 | Caldwell | B60W 60/0027 |
| 2021/0347377 A1 * | 11/2021 | Siebert | B60W 30/18154 |
| 2021/0347383 A1 * | 11/2021 | Siebert | G01C 21/3407 |
| 2022/0164350 A1 * | 5/2022 | Gao | G06V 20/56 |
| 2022/0169278 A1 * | 6/2022 | Refaat | B60W 60/0011 |
| 2023/0041975 A1 * | 2/2023 | Caldwell | G05B 13/0265 |

* cited by examiner

*Primary Examiner* — Jelani A Smith
*Assistant Examiner* — Nada Mahyoob Alqaderi
(74) *Attorney, Agent, or Firm* — Lee & Hayes, P.C.

(57) ABSTRACT

An imitation learning-based machine-learned (ML) model to augment or replace the prediction and/or planner components of an autonomous vehicle may be trained using a two stage and multi-discipline approach. A first stage of training may include training the ML component to output a predicted action associated with a target vehicle and modifying the ML component to reduce a difference between the predicted action and the observed action taken by the target vehicle. A second stage may use reinforcement learning to further tun the ML component. The resultant model may be used on its own, with enough training data, or to rank or weight candidate trajectories generated by a planning component of the vehicle. The ML component may provide embeddings of environment features to first transformer(s) that output to a long short-term memory that outputs to second transformer(s) to determine the predicted action.

20 Claims, 7 Drawing Sheets

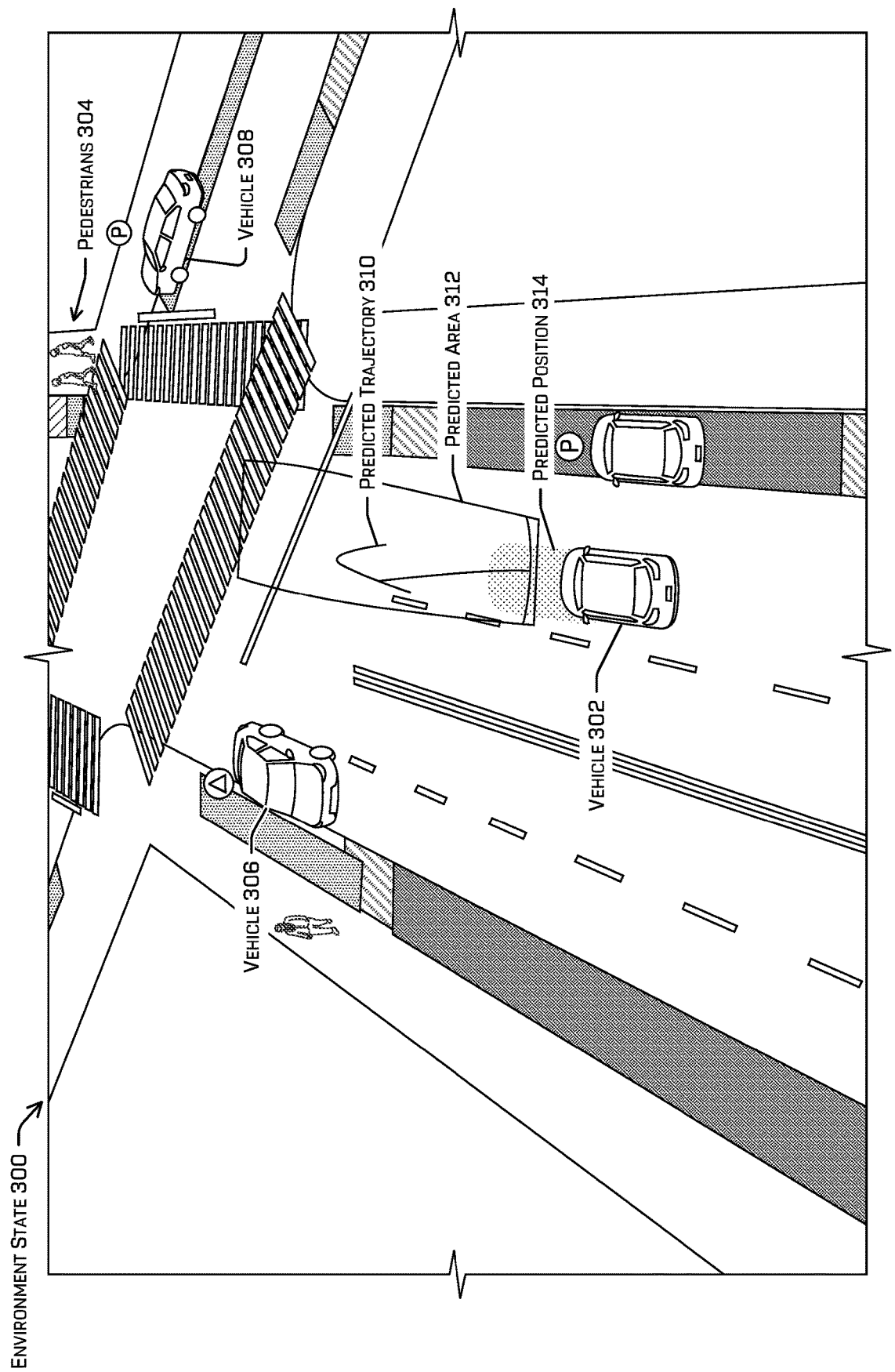

MACHINE-LEARNED COMPONENT HYBRID TRAINING AND ASSISTANCE OF VEHICLE TRAJECTORY GENERATION

BACKGROUND

Using simulations of scenarios may provide a valuable method for training autonomous systems and/or machine-learned model pipelines, such as those incorporated in autonomous vehicles. However, it is exceedingly difficult to generate diverse simulations with enough diversity to adequately train a machine-learned pipeline to account for all real-world scenarios. Moreover, other techniques result in trained models that control the vehicle in awkward manners, such as stopping, shuddering, failing to take an action, or accelerating at inappropriate times or in unnatural-seeming ways.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

FIG. 3 illustrates an example environment state that may be used as part of training an ML component. FIG. 3 also depicts prediction(s) that may be determined by such an ML component based on the environment state. an ML

DETAILED DESCRIPTION

Figure 1:
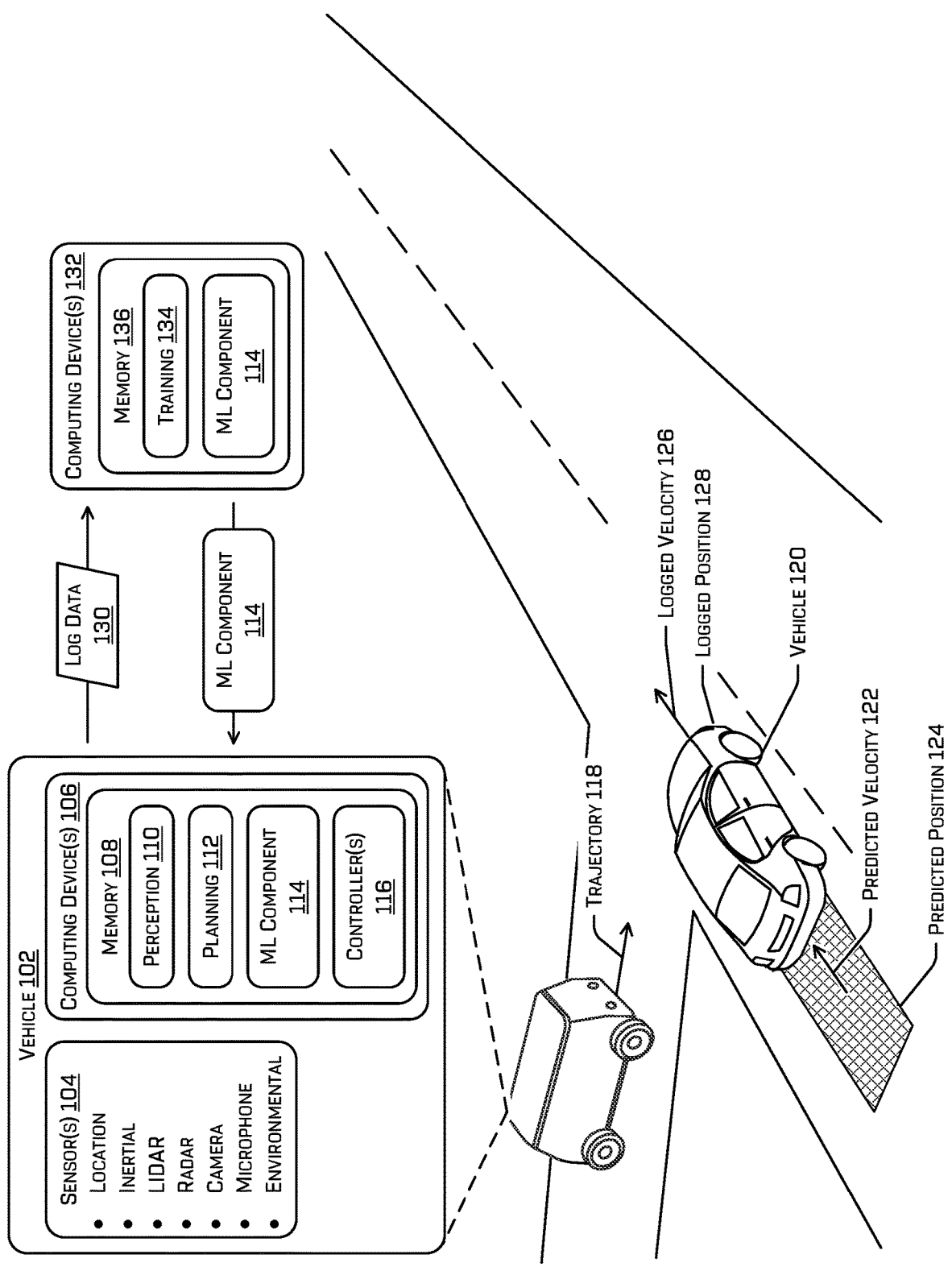
FIG. 1 illustrates an example scenario in which an autonomous vehicle is configured with a machine-learned (ML) component according to the techniques discussed herein.

As noted above, it is difficult to generate and/or provide a comprehensive spectrum of simulations with enough diverse scenarios to adequately train a machine learning model that can account for all real-world scenarios. These situations may cause an autonomous vehicle to perform poorly or undesirably, such as stopping, shuddering, or accelerating at inappropriate times, especially when encountering a real-world scenario that has not previously encountered. This application relates to techniques for improving the performance of navigation of an autonomous vehicle in real-world scenarios, particularly for aberrant circumstances but also for normative driving conditions. For example, the techniques discussed herein may help the autonomous vehicle to quickly adapt to rare traffic conditions or scenarios (such as traffic cones that have been knocked into the middle of a lane, when an object such as a vehicle is blocking part of two lanes, trash laying in the street, etc.) that have not been trained or encountered previously due to a lack of example scenarios or simulations during training.

The techniques discussed herein may take advantage of the characteristics and benefits of different machine learning and/or training algorithms, and train a machine-learned (ML) component that is to be provided to a real-world vehicle for controlling navigation of the real-world vehicle through a plurality of training stages. In some examples, at least some of the plurality of training stages may include different training algorithms. The techniques discussed herein may include using a learning algorithm that may use log data to guide a machine-learned component to learn from scratch at an early stage, and employing, at a later stage, a learning algorithm that may incentivize the machine-learned component to augment the early stage learning by determining rewards that may be used to train the machine-learned component to predict a right action. For example, a first training stage of the plurality of training stages may include a learning algorithm that uses log data, such as an imitation learning technique, for example; and a second training stage may include a learning algorithm based on feedback due to interactions with the environment (e.g., reinforcement learning).

The techniques discussed herein may include receiving log data from a training source. The log data may include, but is not limited to, sensor data, data indicating one or more states of the environment at a first time, and/or one or more actions taken by a target vehicle at a second time after the first time. In some examples, a state of the environment may include real or simulated sensor data and/or perception data determined by a computing device. Such a computing device may be part of an autonomous, semi-autonomous, or data-gathering vehicle or a computing device that receives sensor data from remote sensor(s). Examples of the real or simulated sensor data may include, but are not limited to, image data, lidar data, radar data, map data, traffic data, etc., more examples of which are given herein. In various examples, such log data may comprise raw data associated with such real or simulated sensors, as well as all intermediate messages generated therefrom, such as localization, perception, and prediction signals, up to and including control messages for controlling the vehicle.

In a first training stage of the plurality of training stages, the techniques discussed herein may include receiving a predicted action for the target vehicle at a first time from the ML component. In some examples, the ML component may determine the predicted action for the target vehicle based at least in part on sensor data and/or a state of the environment (determined by a perception component) at that first time point. In other words, the ML component may be trained to map the sensor data and/or state of the environment to a predicted action for the target vehicle (even though the ML component may be designed to control the autonomous vehicle itself). The predicted action may be associated with a future time relative to a time associated with the state of the environment. The techniques discussed herein may include determining a difference between the predicted action determined by the ML component and the action taken by the target vehicle recorded in the log data. In some examples, the techniques discussed herein may include modifying or adjusting the ML component to reduce such difference, for example, according to a learning algorithm. In some examples, the techniques discussed herein may include performing a number of iterations in the first training stage until a point of convergence is reached, a predetermined number of iterations are reached, and/or a predetermined accuracy is achieved.

In some examples, a second training stage subsequent to the first training stage, the techniques discussed herein may include using an output of the ML component (e.g., a predicted action that is based on a current environment state (and/or sensor data) provided as input to the ML component) to control a simulated or real-world vehicle (e.g., an autonomous or semi-autonomous vehicle). In some examples, the techniques discussed herein may include providing information of a state of a simulated or real environment to the ML component, which may produce an output based at least in part on the information of the state of the environment.

In some examples, the techniques discussed herein may include determining a reward based on the performance of the target vehicle while the target vehicle is controlled based at least in part on the output of the ML component. The performance of the target vehicle may be assessed based on a variety of factors, which may include, but are not limited to, an occurrence of a collision, a comfort indication (see U.S. patent application Ser. No. 17/216,547, filed Mar. 29, 2021, the entirety of which is incorporated by reference herein), a jerk and/or acceleration of the target vehicle, etc. In some examples, the techniques discussed herein may include determining a reward associated with the performance of the target vehicle, and modifying the ML component based at least in part on the reward. The techniques discussed herein may include performing a number of iterations in the second training stage until a point of convergence is reached, a predetermined number of iterations are reached, a threshold average reward is achieved, and/or a predetermined accuracy is achieved.

After performing the plurality of training stages, the techniques discussed herein may include transmitting or providing the ML component to the real-world vehicle, to enable the real-world vehicle to perform operations of navigation at least by executing the ML component. In some examples, the techniques discussed herein may include continuously monitoring the performance of the navigation of the real-world autonomous vehicle or a simulated autonomous vehicle under the control or direction of the ML component, and receiving navigation data from the real-world vehicle to modify the ML component. For example, the real-world vehicle may determine a current state of the environment in which the real-world vehicle is located from sensor data, and provide information about the current state of the environment to the ML component. The ML component may then determine a predicted action for the autonomous vehicle based on the current state of the environment and/or sensor data, and provide the candidate action to a planning component of the real-world vehicle. Note that, although the first training stage includes determining a predicted action of an object other than the autonomous vehicle, the second stage includes determining a predicted action of the autonomous vehicle itself. This type of predicted action is called a reflexive predicted action herein to differentiate between predicted actions associated with other objects and predicted actions associated with the autonomous vehicle (a reflexive predicted action). The planning component may use the reflexive predicted action to determine a ranking of one or more candidate trajectories and/or determine scores associated with one of the candidate trajectories based on the reflexive predicted action, and determine a particular trajectory from the one or more candidate trajectories to control the real-world vehicle to navigate through the environment at a next time. In other words, the reflexive predicted action generated by the ML component may be used to rank and/or weight candidate trajectories generated by the planning component. The real-world vehicle may additionally or alternatively receive sensor data and/or determine perception data based at least in part on the sensor data that may be included in log data used as part of the first stage of training.

The techniques discussed herein may improve the navigation of an autonomous vehicle by increasing the number of scenarios that the autonomous vehicle may safely and efficiently navigate. The techniques may also improve the accuracy of the ML component to accurately predict a best action to take in a given scenario. This may also improve the safety of the vehicle by increasing the predictability of the autonomous vehicle's actions for other entities in the environment, such as drivers of other vehicles, and selecting actions for controlling the vehicle that closely imitate or are better than human actions. The techniques discussed herein may also improve the safety and efficiency of the autonomous vehicle by increasing the amount of data available to a planning component for making decisions, among other benefits. The techniques may also reduce a number of times that an autonomous vehicle transmits a request for teleoperator input, stops, stutters, hesitates, etc.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic and/or sonar sensor, and/or other depth-sensing sensor), an image sensor (e.g., a camera), an audio sensor (e.g., a microphone), and/or environmental sensor (e.g., a barometer, a hygrometer).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

The autonomous vehicle 102 may provide the sensor data received from such sensor(s) 104 to one or more systems of the autonomous vehicle 102 to accomplish a variety of functions of the autonomous vehicle. For example, one or more systems may control a passenger ride experience (e.g., temperature/humidity control, interior display control, door control functionality, seat functionality), a localization and/or mapping system may generate a map of surroundings of the autonomous vehicle and/or a position and/or orientation of the autonomous vehicle 102 within a map, an emitter control component may control exterior emitters (e.g., turn signal(s), headlight(s), taillight(s), speaker(s), microphone (s)), a perception system that may detect and track object(s) in an environment of the autonomous vehicle, a prediction system that may predict future positions, velocities, and/or accelerations of objects in the environment, a planning system that may determine a trajectory for controlling motion of the autonomous vehicle, etc. These systems may, in turn, include one or more subcomponents.

Computing device(s) 106 may comprise a memory 108 storing a perception component 110, a planning component 112, an ML component 114, and/or system controller(s) 116. Although depicted in FIG. 1 for illustrative purposes, it should be understood that the ML component 114 may reside in/on a separate computing device (or otherwise) than any one or more of the other components. The perception component 110, the planning component 112, the machine-learned (ML) component 114, and/or the controller(s) 116 may include one or more ML models and/or other computer-executable instructions.

In general, the perception component 110 may determine what is in the environment surrounding the vehicle 102 and the planning component 112 may determine how to operate the vehicle 102 according to information received from the perception component 110 For example, multiple sub-components of the perception component 110 and/or planning component 112 may be used to determine trajectory 118 based at least in part on the perception data and/or other information such as, for example, one or more maps, localization information (e.g., where the vehicle 102 is in the environment relative to a map and/or features detected by the perception component 110), and/or a path generated by a high level mission planner of the planning component 112.

The trajectory 118 may comprise instructions for controller(s) 116 to actuate drive components of the vehicle 102 to effectuate a steering angle and/or steering rate, which may result in a vehicle position, vehicle velocity, vehicle acceleration, yaw, yaw rate, etc. For example, the trajectory 118 may comprise a target heading, target steering angle, target steering rate, target position, target velocity, and/or target acceleration for the controller(s) 116 to track. In some examples, the controller(s) 116 may comprise software and/or hardware for actuating drive components of the vehicle 102 sufficient to track the trajectory 118.

In some examples, the perception component 110 may comprise a pipeline of hardware and/or software, which may include one or more GPU(s), ML model(s), Kalman filter(s), and/or the like. The perception component 110 may receive sensor data from the sensor(s) 104 and determine data related to objects in the vicinity of the vehicle 102 (e.g., classifications associated with detected objects, instance segmentation(s), semantic segmentation(s), two and/or three-dimensional bounding boxes, tracks), global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. The object classifications determined by the perception component 110 may distinguish between different object types such as, for example, a passenger vehicle, a pedestrian, a bicyclist, motorist, a delivery truck, a semi-truck, traffic signage, and/or the like. For example, such a detection may be conducted by an object detection component of the perception component 110, which may comprise one or more ML model(s) and/or ML or other processing software and/or hardware pipeline (s). A track may comprise a historical, current, and/or predicted object position, velocity, acceleration, and/or heading.

In the depicted example, the vehicle 102 may detect a vehicle 120. The perception component 110 may comprise one or more prediction components for handling different object types, such as traffic signage, pedestrians, cyclists, vehicles, construction workers and vehicles, etc., and estimate, based at least in part on sensor data and possibly an ML model, a predicted trajectory associated with the vehicle 120 that is detected by the detection component of the perception component 110. An additional or alternate prediction component of the perception component 110 may determine an attentiveness of a driver of the vehicle 120. The data produced by the perception component 110 may be collectively referred to as perception data. Once the perception component 110 has generated perception data, the perception component 110 may provide the perception data to the planning component 112.

The vehicle 102 may predict or estimate a velocity and a position associated with the vehicle 120. The ML component 114 of the vehicle 102 may comprise an ML model trained to estimate, based at least in part on an environment state indicated by at least a portion of the sensor data and/or prediction data, a predicted velocity 122 and a predicted position 124 associated with the vehicle 120, which may be compared with a logged velocity 126 and a logged position 128 during a training phase. The environment state may include perception data determined by the perception component 110 associated with vehicle 120, such as a velocity, position, heading, and/or the like, as well as other data, such as environmental factors, a map or layout of the environment, data associated with dynamic and/or static object(s), etc. The environment state may additionally or alternatively include sensor data. In some examples, any of the data determined by the perception component 110 and/or the planning component 112 may be stored as log data 130, which may be transmitted to computing device(s) 132. Such log data 130 may include a logged velocity 126 and/or logged position 128 of vehicle 120 determined by the perception component 110. The logged velocity 126 and/or logged position 128 may be associated with a time after a time associated with the environment state.

In some examples, training the ML component 114 may include determining a difference between predicted object data and actual object data recorded in the log data 130. For example, the ML component 114 may receive as input environment state data (which may include sensor data and/or perception data, for example) indicating a state of the environment at a first time. The ML component 114 may use the environment state data to predict object data associated with a second, future, time and associated with a target object, which is being used to train the ML component 114. Such predicted object data may include, for example, a predicted position, velocity, acceleration, area which the object is capable of and/or likely to occupy within a time period, and/or the like. Training the ML component 114 may include determining a difference between the predicted object data and actual object data as stored in the log data. For example, in the depiction of FIG. 1, this may include determining a difference between the predicted position 124 and the logged position 128 and another difference between the predicted velocity 122 and the logged velocity 126. In the depicted example, the predicted position 124 is slightly behind the logged position 128 and the predicted velocity 122 angle and/or magnitude is slightly different than the logged velocity 126. A training component 134 may use the difference(s) to alter the ML component 114 such that the difference(s) would be decreased.

The ML component 114 may be received from one or more computing devices 132, after the ML component 114 has been trained by the one or more computing devices 132 that may execute a training component 134 included in the memory 136 of the one or more computing devices 132. The training component 134 may include different learning algorithms, and may apply one or more learning algorithms to train the ML component 114 using log data. The data produced by the ML component 114 may be collectively referred to as action prediction data, which may include the predicted velocity 122 and/or predicted position 124. Once the ML component 114 has determined action prediction data based at least in part on an environment state, the ML component 114 may provide the action prediction data to the planning component 112. The action prediction data may include a predicted position, velocity, heading, acceleration, and/or the like associated with an object. In some examples, the ML component 114 may be part of a prediction sub-component of the perception component 110.

The planning component 112 may use sensor data, the perception data received from the perception component 110, and/or the action prediction data received from the ML component 114, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; generate, substantially simultaneously and based at least in part on the perception data and/or simulated perception data (which may further include predictions regarding detected objects in such data), a plurality of potential trajectories for controlling motion of the vehicle 102 in accordance with a receding horizon technique (e.g., 1 micro-second, half a second, eight seconds) to control the vehicle to traverse the route (e.g., in order to avoid any of the detected objects); and select one of the potential trajectories as a trajectory 118 of the vehicle 102 that may be used to generate a drive control signal that may be transmitted to drive components of the vehicle 102. FIG. 1 depicts an example of such a trajectory 118, represented as an arrow indicating a heading, velocity, and/or acceleration, although the trajectory itself may comprise instructions for controller(s) 116, which may, in turn, actuate a drive system of the vehicle 102.

Example System

Figure 2:
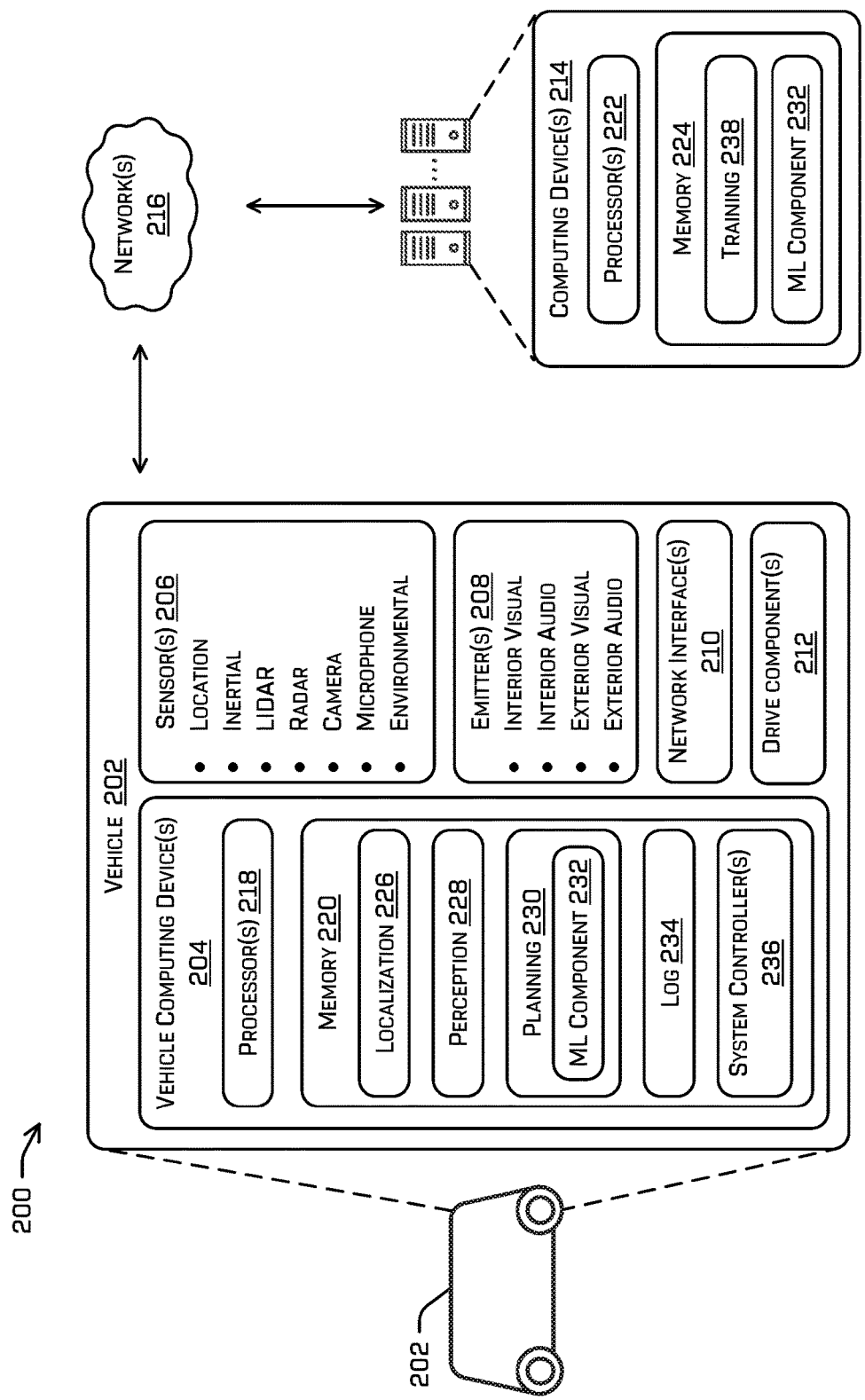
FIG. 2 illustrates a block diagram of an example system comprising an ML component and/or a training component for conducting multi-stage training according to the techniques discussed herein.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may include lidar sensors, radar sensors, ultrasonic transducers, sonar sensors, location sensors (e.g., global positioning system (GPS), compass), inertial sensors (e.g., inertial measurement units (IMUs), accelerometers, magnetometers, gyroscopes), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays), and one or more audio emitter(s) (e.g., speakers, speaker arrays, horns) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, ML component 232, log component 234, and/or system controller(s) 236. Perception component 228 may represent perception component 110, planning component 230 may represent planning component 112, ML component 232 may represent ML component 114, and/or system controller(s) 236 may represent controller(s) 116.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include map(s) of an environment and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the planning component 230 and/or action selection component 234, a location and/or orientation of the vehicle 202 relative to the environment and/or sensor data associated therewith.

In some instances, the perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 228 is referred to as perception data.

In some examples, sensor data and/or perception data may be used to generate an environment state that represents a current state of the environment. For example, the environment state may be a data structure that identifies object data (e.g., object position, area of environment occupied by object, object heading, object velocity, historical object data), environment layout data (e.g., a map or sensor-generated layout of the environment), environment condition data (e.g., the location and/or area associated with environmental features, such as standing water or ice, whether it's raining, visibility metric), sensor data (e.g., an image, point cloud), etc. In some examples, the environment state may include a top-down two-dimensional representation of the environment and/or a three-dimensional representation of the environment, either of which may be augmented with object data. In yet another example, the environment state may include sensor data alone. In yet another example, the environment state may include sensor data and perception data together.

The ML component 232 may receive sensor data from the sensor(s), and/or perception data from the perception component 228 after the perception component 228 processes at least some of the sensor data to produce the perception data. In some examples, the ML component 232 may comprise an ML model that is trained to predict a next action that an object will take based at least in part on the sensor data and/or the perception data. In some examples, the ML component 232 of the vehicle 202 may be transmitted from the computing device(s) 214 to the vehicle 202 after the ML component 232 has been trained wholly or in part by the computing device(s) 214 that may execute a training component 238. The training component 238 may include one or more machine learning algorithms, and may apply one or more machine learning algorithms to train the ML component 114 using log data provided by the log component 234. Data determined by the ML component 232 is referred to as action prediction data.

The planning component 230 may receive a location and/or orientation of the vehicle 202 from the localization component 226, perception data from the perception component 228, and/or action prediction data from the ML component 232, and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 236 and/or drive component(s) 212 may parse/cause to be carried out, second instructions for the emitter(s) 208 may be formatted according to a second format associated therewith). In at least one example, the planning component 230 may comprise a nominal trajectory generation subcomponent that generates a set of candidate trajectories, and selects a trajectory for implementation by the drive component(s) 212 based at least in part on determining a cost associated with a trajectory according to U.S. patent application Ser. No. 16/517,506, filed Jul. 19, 2019 and/or U.S. patent application Ser. No. 16/872,284, filed May 11, 2020, the entirety of which are incorporated herein for all purposes.

The log component 234 may record different types of data generated and/or received by various components of the vehicle 202. For example, the log component 234 may store, as log data, sensor data captured by the sensor(s) 206, location and/or orientation information of the vehicle 202 relative to the environment determined by the localization component 226, sensor data received from the drive component(s) 212, perception data generated by the perception component 228, and/or action prediction data determined by the ML component 232. The log component 234 may provide one or more of these different types of data to the computing device(s) 214 as training data to modify the ML component 232 and/or to generate a new ML component.

The memory 220 and/or 224 may additionally or alternatively store a mapping system (e.g., generating a map based at least in part on sensor data), a planning system, a ride management system, etc. Although localization component 226, perception component 228, planning component 230, ML component 232, log component 234, and/or system controller(s) 236 are illustrated as being stored in memory 220, any of these components may include processor-executable instructions, machine-learned model(s) (e.g., a neural network), and/or hardware and all or part of any of these components may be stored on memory 224 or configured as part of computing device(s) 214.

As described herein, the localization component 226, the perception component 228, the planning component 230, the ML component 232, the log component 234, and/or other components of the system 200 may comprise one or more ML models. For example, the localization component 226, the perception component 228, the planning component 230, and/or the ML component 232 may each comprise different ML model pipelines. The ML component 232 may use a different ML model or a combination of different ML models in different circumstances. For example, the ML component 232 may use or preferentially use a first ML model that is tailored to predicting an action in a winter time when border lines between road lanes may not be clear or may be covered by snow, and/or a second ML model that may provide a more conservative action in a crowded traffic condition (such as in a downtown area, etc.). In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 220 may additionally or alternatively store one or more system controller(s) 236, which may be configured to control steering, propulsion, braking, safety, emitters, communication, and other systems of the vehicle 202. These system controller(s) 236 may communicate with and/or control corresponding systems of the drive component(s) 212 and/or other components of the vehicle 202.

In an additional or alternate example, vehicle 202 and/or computing device(s) 214 may communicate (e.g., transmit and/or receive messages over network(s) 216) with one or more passenger devices (not shown). A passenger device may include, for example, a smart phone, portable computer such as a laptop or tablet, wearable device (e.g., smart glasses, smart watch, earpiece), and/or the like. Although a passenger device may be a device associated with a passenger that is discrete from device(s) of the autonomous vehicle, it is contemplated that the passenger device may be a sub-system and/or a device of the vehicle 202. For example, the passenger device may additionally or alternatively comprise a display and/or one or more input/output devices, such as a touchscreen, microphone, speaker, and/or the like. In some examples, the vehicle 202 may transmit messages and/or receive messages from the passenger device.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Environment State

FIG. 3 illustrates an example environment state 300 that may be used as part of training an ML component, as discussed herein. In particular, the ML component may predict, based on the environment state 300, a next action that vehicle 302 will take. Vehicle 302 may be a target vehicle that training the ML component may be based on. The environment state 300 may have been determined based at least in part on log data, in some examples. an ML The environment state 300 may indicate various objects that may have been detected by a perception component or that may have been generated according to a simulation. For example, the objects may include various pedestrians, such as pedestrians 304, and various vehicles, such as vehicle 306 and vehicle 308. Depending on the scenario, more or less objects may be present, such as static objects. The environment state 300 additionally includes data about the roadway, such as a layout of the roadway, a number of lanes, the existence and placement of legal markers (e.g., lines on the road, signs, stop lines, crosswalks), and the availability of spaces for parking (e.g., the shaded and cross-hatched areas), etc.

In some examples, the ML component may generate a predicted action associated with the target vehicle, which is being used to train the ML component—vehicle 302 in the depicted instance. In other words, the ML component may determine a predicted action of the vehicle 302 given the environment state 300. For example, the ML component may determine a predicted trajectory 310 that the vehicle 302 will execute, a predicted area 312 that the vehicle 302 is capable of and/or likely to occupy, and/or a predicted position 314 of the vehicle 302. Although the environment state 300 is depicted as a three-dimensional depiction in FIG. 3, it is understood that the environment state 300 may be a data structure that may include a top-down perspective of the depicted scenario, such as an image; and/or various data structures that may be associated with each detected object, such as an object track that indicates a historic and/or current position, orientation, velocity, acceleration, classification, portion of sensor data, and/or the like associated with an object. Such data may be determined by various sub-components of a perception component or generated by a simulation component.

The illustrated predicted trajectory 310 indicates that the vehicle 302 will continue its trajectory and then slow down before the stop line before the crosswalk. The predicted area 312 may indicate that the vehicle 302 is capable of and likely to occupy the predicted area 312 within a time range. The predicted position 314 indicates that a position the ML component predicted the vehicle 302 would occupy at a particular time. In some examples, the techniques discussed herein may include determining a difference between such predictions and the actual position, trajectory, or the like executed by the vehicle 302.

Example Processes

Figure 4A:
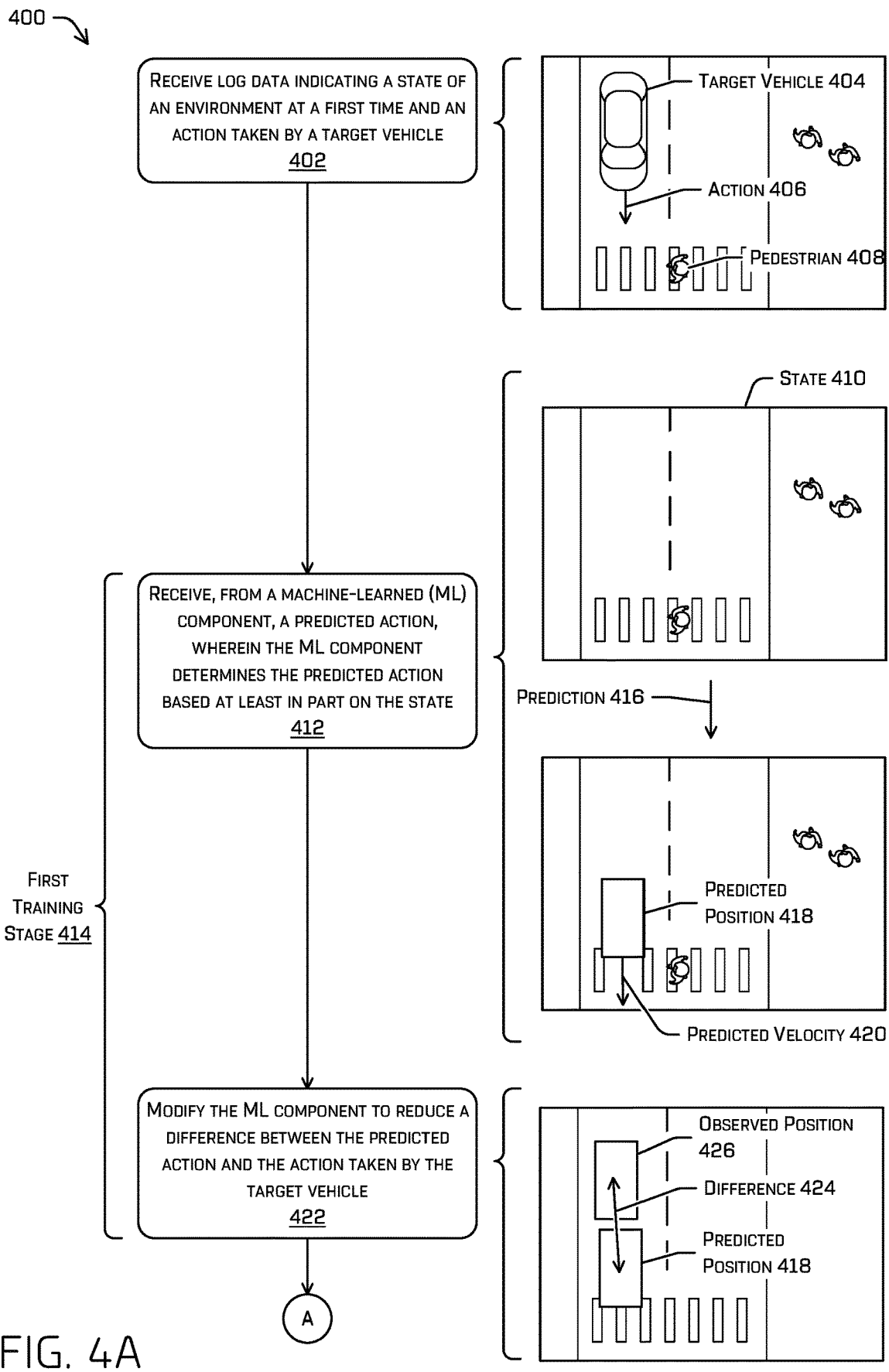
FIGS. 4A and 4B illustrate a flow diagram of an example process for training an ML component according to the techniques discussed herein.
Figure 4B:
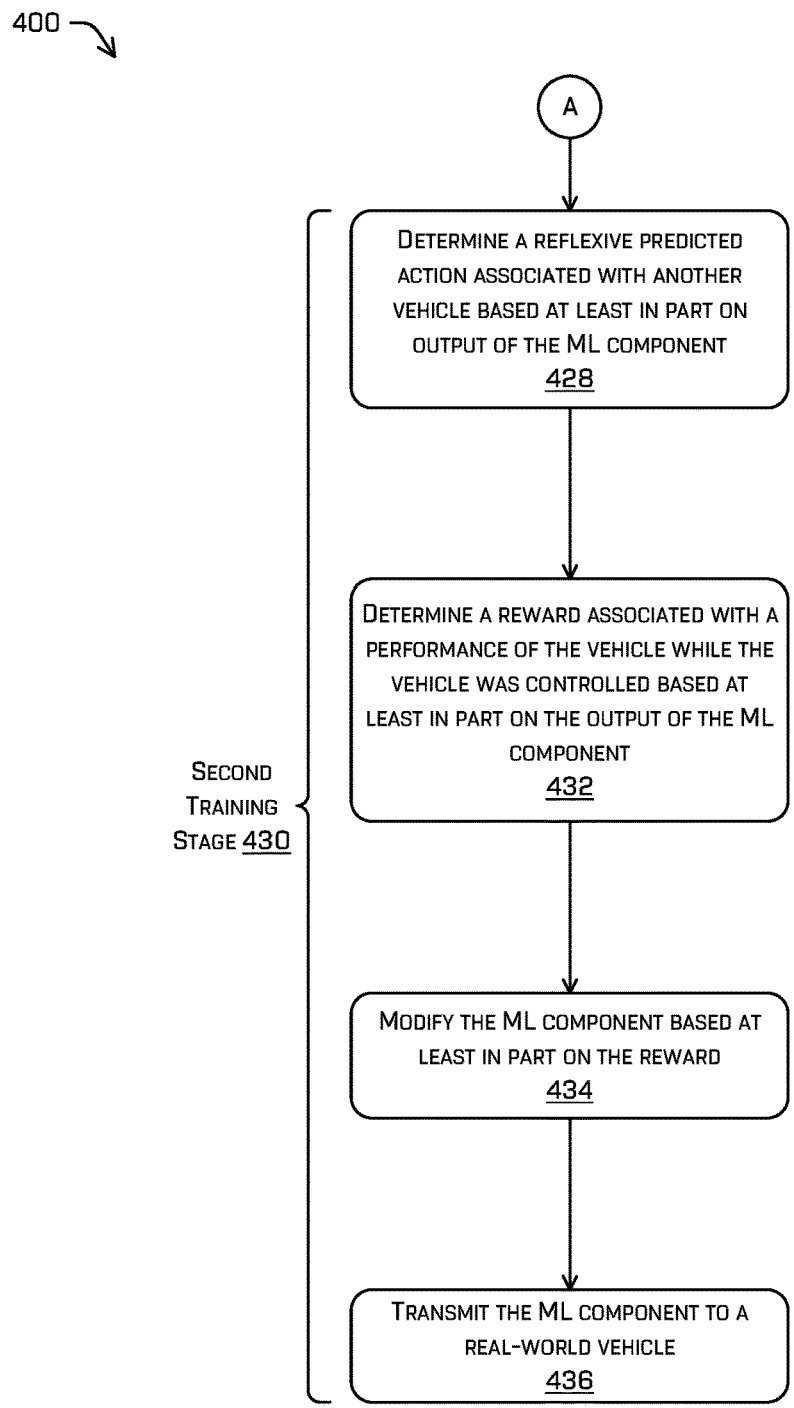
Figure 5:
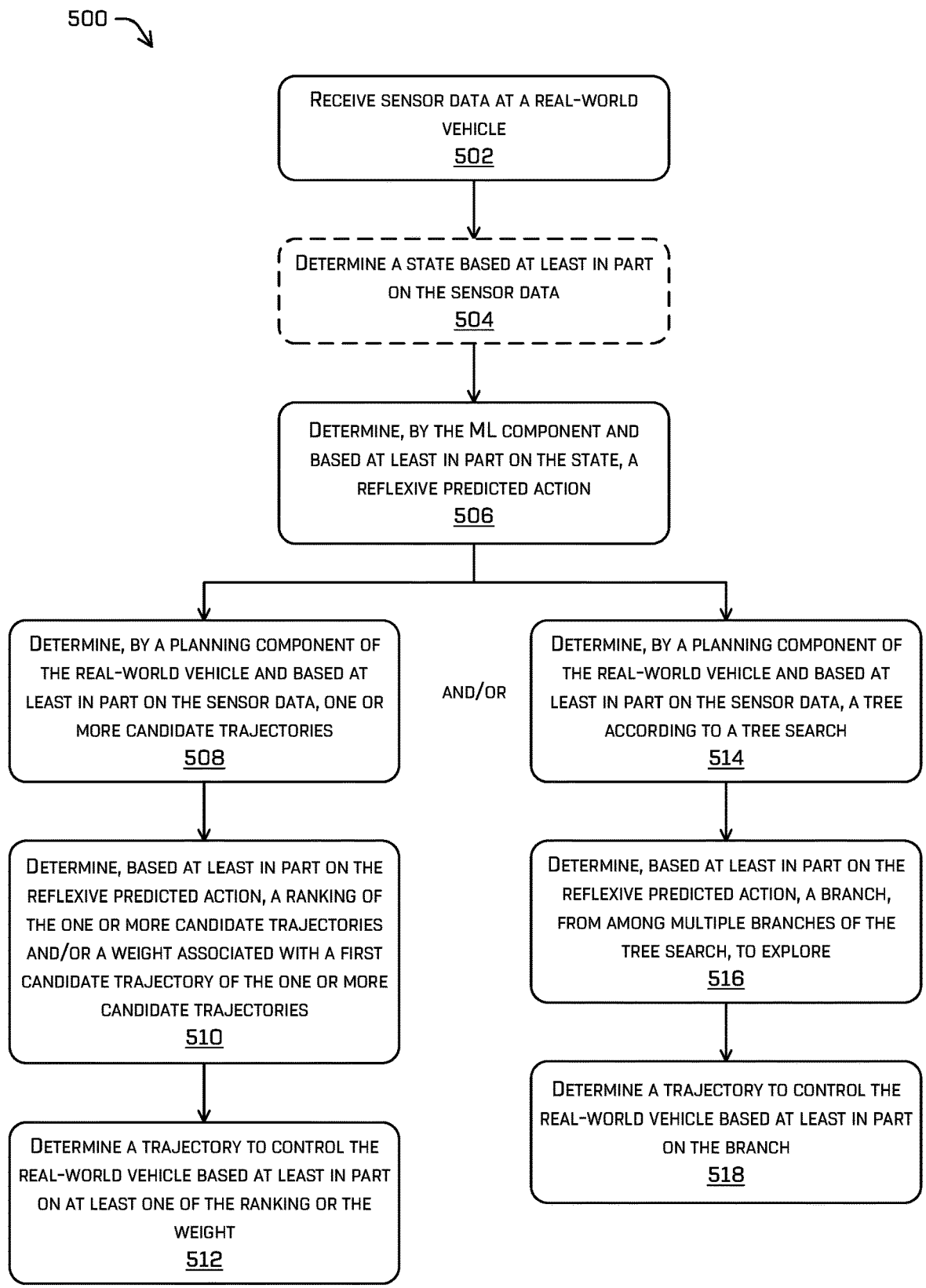
FIG. 5 illustrates a flow diagram of an example process for determining a trajectory of an autonomous vehicle according to the techniques discussed herein.

FIGS. 4A, 4B, and 5 illustrate flow diagrams of example process 400 and example process 500, respectively, for training an ML component to be transmitted to a real-world vehicle under different training stages, and controlling the real-world vehicle with the help of the ML component. In some examples, example process 400 may be conducted based at least in part on log data received from a simulation (see U.S. patent application Ser. No. 16/581,632, filed Sep. 24, 2019, the entirety of which is incorporated by reference herein) or a real-world vehicle and conducted at a remote computing device, such as the computing device(s) 214. In an additional or alternate example process 500 may be conducted by a simulated vehicle or real-world vehicle such as the vehicle 202. In some examples, example process 400 and/or example process 500 may be conducted to provide an ML component to an autonomous vehicle for controlling and/or assisting navigation of the vehicle through an environment. For simplicity, the following examples discuss model training and trajectory selection, although the techniques may be applied to other systems.

At operation 402, example process 400 may comprise receiving log data that indicates a state of an environment at a first time and an action taken by a target vehicle, according to any of the techniques discussed herein. The log data may include sensor data captured and/or simulated by sensors of the target vehicle and/or perception data, and information (which may be in terms of a velocity, a direction, an acceleration, etc.) about the action taken by the target vehicle. Examples of the sensor data may include lidar data, radar data, infrared image data, visual image data, sonar data, and/or the like. For example, FIG. 4A depicts an example scenario or environment in which a target vehicle 404 takes an action 406 of stopping before a crosswalk while a pedestrian 408 is walking on the crosswalk. In some examples, the target vehicle 404 may be a vehicle that is being used to train the ML model it is the target vehicle in that it is the vehicle the ML model is learning from. The action 406 may indicate a position, acceleration (i.e., deceleration in this case), velocity, trajectory (e.g., which may indicate one or more of the same properties over a time period), and/or the like. The sensor data may include an image of the pedestrian 408, an image of a traffic light, etc. In some examples, the log data may include information indicating an example state 410 of the environment, which may, in the depicted example, indicate that the pedestrian 408 is crossing the crosswalk, two other pedestrians are walking along a sidewalk, the existence and location of the crosswalk and lanes of the road, etc. In some examples, a pre-processing component may determine the environment state 410 based at least in part on sensor data and/or perception data stored in the log data or received directly from a perception component executing on a vehicle or executing on a computing device, using logged sensor data.

In yet another example, a pre-processing component may transform at least a portion of the log data into an intermediate output that is used by the ML component discussed herein. For example, the pre-processing component may determine the intermediate output by a neural network or at least a portion of a neural network. The intermediate output may be an output of a hidden layer of a neural network, which means that the intermediate output may not be humanly recognizable as being cogent data. As such, this intermediate output may be an intermediate latent space determined by an intermediate (or hidden) layer of a neural network and/or other ML model. Any one or more of the sensor data, perception data, or intermediate output may be provided to the ML component as input as part of the environment state.

At operation 412, example process 400 may comprise receiving a predicted action from an ML component in a first training stage 414, where the ML component may determine the predicted action based at least in part on the state of the environment, according to any of the techniques discussed herein. As opposed to other prediction methods, the ML component predicts an action for a single object and does so based on environment state data and not just a prior position, speed, etc. of the object. Example process 400 may include a plurality of training stages, and perform training of an ML component (such as the ML component 232) using a training component (such as the training component 238). In some examples, example process 400 may train the ML component through a first learning algorithm during a first training stage, and training the ML component in subsequent stage(s) through one or more other learning algorithms which may be different from the first learning algorithm. For example, example process 400 may train the ML component through a first learning algorithm based at least in part on log data (e.g., imitation learning) in the first training stage, and train the ML component through a second learning algorithm that employs a reward strategy (such as a reinforcement learning, etc.) in a second training stage that is subsequent to the first training stage. In other words, the ML component may receive the state 410 as input and may be trained to determine the prediction 416 as output. In some examples, the state 410 may further include data about the target vehicle (e.g., position, orientation, current speed, acceleration, and/ or heading), although in the depicted state 410 the environment itself is emphasized by removing the depiction of the target vehicle 404.

For example, FIG. 4A depicts the example state 410 where a pedestrian (e.g., the pedestrian 408) is walking on the crosswalk. In this example first training stage 414, the ML component may be trained through an imitation learning. For example, based on the given state 410 of the environment, the ML component may produce a prediction 416 (for example, a predicted action for the target vehicle 404). In some examples, the predicted action may include a plurality of components, which may include a predicted position 418 and/or a predicted velocity 420. The predicted action may additionally or alternatively include a predicted acceleration, area which the object is capable of and/or likely to occupy within a time period, predicted steering angle, steering rate, and/or the like. The predicted action may, itself, be a data structure.

At operation 422, example process 400 may modify or adjust the ML component based on a difference between the predicted action and an actual action 406 taken by the target vehicle 404 as stored in the log data. In some examples, example process 400 may modify or adjust the ML component to reduce the difference (for example, a difference 424) between the predicted action (such as the predicted position 418) and the actual action (such as an observed position 426) taken by the target vehicle 404. For example, FIG. 4A illustrates a difference 424 between the predicted position 418 and an observed position 426 taken by the target vehicle 404. Example process 400 may modify or adjust the ML component to reduce such difference 424, in addition or alternative to difference(s) between other component(s) included in the predicted action and component(s) included in observed action recorded in the log data. Note that, although the difference 424 is depicted as a distance in FIG. 4A, it is understood that the difference may take different forms, depending on the type of prediction. For example, the difference may be a difference in angles, an intersection over union of two areas, a vector difference between two vectors indicating speeds and/or headings, and/or the like. In some examples, example process 400 may continue to iterate the training of the ML component through the first learning algorithm in the first training stage until a number of predetermined iterations, a point of convergence, and/or a predetermined degree of accuracy is/are reached. In some examples, the degree of accuracy may be determined based at least in part on the difference, such as by determining when difference(s) between the actual and observed object characteristics is less than respective threshold(s).

Turning to FIG. 4B, at operation 428, example process 400 may include determining a reflexive predicted action associated with another vehicle (i.e., the autonomous vehicle that will implement the ML component) based at least in part on output of the ML component. The other vehicle may include a simulated vehicle or real-world vehicle. The reflexive predicted action may be a prediction that this other vehicle may take based at least in part on an environment state (e.g., sensor data, perception data, and/or the like). The reflexive predicted action may itself be used to control this other vehicle and/or it may be used to determine a trajectory for controlling the vehicle, as discussed in more detail herein. As described above, in the second training stage that is subsequent to the first training stage, example process 400 may include training the ML component using a second learning algorithm that employs a reward strategy, such as a reinforcement learning.

At operation 432, example process 400 may include determining a reward associated with the performance of the vehicle based at least in part on the output of the ML component, such as by using the reflexive predicted action as the trajectory for controlling the other vehicle or as part of the process for determining such a trajectory. In some examples, the performance of the vehicle may be determined or evaluated based on a plurality of factors, which may include, but are not limited to, an occurrence of a collision, a comfort indication (see U.S. patent application Ser. No. 17/216,547, etc. Example process 400 may determine the reward based at least in part on the second learning algorithm that employs a reward strategy. See U.S. patent application Ser. No. 17/347,088, filed Jun. 14, 2021, the entirety of which is incorporated by reference herein.

The reward may be based at least in part on a variety of operating parameter(s), such as a minimum distance between the vehicle and a nearest object, an acceleration required to avoid impact, a time until impact, a deviation from a route, whether a jerk and/or acceleration by the vehicle met or exceeded a threshold jerk and/or a threshold acceleration, etc. In some examples, the reward may comprise a weighted sum of sub-rewards. In an additional or alternate example, at least one of the sub-rewards may be a regressed value determined by a machine-learned model. For example, the reward output by the machine-learned model may be based at least in part on a predicted likelihood of impact determined by the machine-learned model. Additional or alternate metrics and/or manners of determining such a reward are discussed in further detail in U.S. patent application Ser. No. 17/216,547, filed Mar. 29, 2021, and U.S. patent application Ser. No. 16/953,277, filed Nov. 19, 2020, both of which are incorporated by reference herein for all intents and purposes. To give an example and without limitation, operating constraint(s) that may be used to determine the reward may include kinematic and/or qualitative metrics associated with operation of the vehicle, such as a minimum distance between the vehicle and a nearest object, an acceleration required to avoid impact, a time until impact, a deviation from a route, whether a jerk and/or acceleration by the vehicle met or exceeded a threshold jerk and/or a threshold acceleration, a predicted likelihood of impact, etc. The operating constraint(s) may additionally or alternatively comprise weights associated with different minimum distances that may be used to reduce the reward or boost the reward based at least in part on the minimum distance At operation 434, example process 400 may include modifying the ML component based at least in part on the reward associated with the performance of the vehicle. After determining the reward associated with the performance of the vehicle, example process 400 may further apply the second learning algorithm (such as the reinforcement learning algorithm described in U.S. patent application Ser. No. 17/347,088) to modify or update the ML component based at least in part on the reward.

At operation 436, example process 400 may include transmitting or providing the ML component to a real-world vehicle. After performing a predetermined number of iterations and/or a point of convergence is reached, example process 400 may complete the second training stage for the ML component. Example process 400 may transmit or provide the ML component to a real-world vehicle, which may employ the ML component to assist autonomous navigation. In some examples, example process 400 may perform one or more subsequent stages using the first learning algorithm and/or other learning algorithm(s) to train the ML component until a predetermined number of training stages and/or a predetermined degree of accuracy is/are reached.

Turning to FIG. 5, at operation 502, example process 500 may include receiving sensor data at a real-world vehicle. The sensor data may include lidar data, radar data, infrared image data, visual image data, sonar data, GPS data, and/or the like, according to the techniques discussed herein. For example, the real-world vehicle may include sensor(s) 104, from which the real-world vehicle may obtain a plurality of different types of sensor data.

At operation 504, example process 500 may include determining a state of a current environment around the real-world vehicle based at least in part on the sensor data. For example, based on the sensor data, such as image data, lidar data, and/or radar data, for example, the real-world vehicle may determine a data structure indicating a current state of the environment associated with the real-world vehicle. The state may include information about objects around the real-world vehicles, such as types of the objects, distances and directions of the objects from the real-world vehicles, velocities of the objects, a layout of the environment, conditions associated with the environment, etc. In some examples, operation 504 may be skipped, as the sensor data may be used alone. In an additional or alternate example, the sensor data may be used in addition to perception data.

At operation 506, example process 500 may include determining, by the ML component, a reflexive predicted action associated with the real-world vehicle or a simulation thereof (e.g., a simulation of or a real-world autonomous vehicle) based at least in part on the state of the current environment. Based on the state of the current environment (such as types of the objects, distances and directions of the objects from the real-world vehicles, velocities of the objects, etc.), the real-world vehicle may employ the ML component to determine or produce a reflexive predicted action which may include, for example, one or more of a predicted velocity, a predicted position, a predicted acceleration, a steering angle, a steering direction, etc. associated with the autonomous vehicle. In other words, instead of using the ML component to predict an action of an object outside the autonomous vehicle, the ML component predicts an action of the autonomous vehicle itself, given the environment state.

Additionally, at operation 508, example process 500 may include determining one or more candidate trajectories by a planning component of the real-world vehicle based at least in part on the sensor data. For example, the planning component may determine how to operate the real-world vehicle according to information received from a perception component (such as the perception component 110), and determine one or more candidate trajectories based at least in part on the perception data and/or other information such as, for example, one or more maps, localization information, and/or a path generated by a high level mission planner of the planning component, etc., according to the techniques discussed herein. For example, the planning component may determine a plurality of potential trajectories for controlling motion of the vehicle 102 in accordance with a receding horizon technique (e.g., 1 micro-second, half a second) to control the vehicle to traverse a route and avoid any of detected object, including a predicted action of an object, as determined according to example process 400. The trajectories determined at operation 508 may be determined by a nominal/primary planning component, whereas the reflexive predicted action determined at operation 506 may be determined by the ML component discussed herein.

At operation 510, example process 500 may include determining a ranking of the one or more candidate trajectories and/or a weight associated with a first candidate trajectory of the one or more candidate trajectories based at least in part on the reflexive predicted action. After (or during) determining the one or more candidate trajectories by the planning component, the real-world vehicle may rank or weight the one or more candidate trajectories based at least in part on the reflexive predicted action obtained by the ML component. For example, the real-world vehicle may give a higher rank or a greater weight to a candidate trajectory if the candidate trajectory is more similar to a trajectory identified by the reflexive predicted action, and vice versa. For example, operation 510 may include determining a difference between the first candidate trajectory and the reflexive predicted action and ranking or weighting the first candidate trajectory based at least in part on the difference, wherein the ranking is higher/better and/or weight is greater as the difference decreases.

In some examples, the weight may be incorporated as part of a cost function that determines a total cost associated with a candidate trajectory, as discussed in more detail in U.S. Patent Application No. 3175US. The cost function may use the weight as a sub-cost that is summed with other costs, such as costs associated with a distance to a nearest object, whether the candidate trajectory would result in a collision with an object, an acceleration and/or jerk associated with the candidate object, progress along a route accomplished by the candidate trajectory, deviation from a target position/lane/reference, etc.

At operation 512, example process 500 may include determining a trajectory to control the real-world vehicle based at least in part on at least one of the ranking or the weight. For example, example process 500 may include determining a trajectory, from among the one or more candidate trajectories, that has the highest ranking or weight from among the one or more candidate trajectory as a trajectory to control the real-world vehicle.

Additionally or alternatively, at operation 514, example process 500 may include determining a tree by the planning component of the real-world vehicle according to a tree search based at least in part on the sensor data. See U.S. patent application Ser. No. 17/394,334, filed Aug. 4, 2021, the entirety of which is incorporated by reference herein. For example, the tree may be a data structure such as a directed acyclical graph (DAG), upper confidence bounds applied to trees (UCT), determinized sparse partially observable tree (DESPOT), or the like for modeling control states and environment states. Such a tree may be determined as part of a tree search conducted by the planning component and may include executing a Monte-Carlo tree search (MCTS); partially observable Monte-Carlo planning (POMCP); Markov decision process (MDP), such as a partially observable MDP (POMDP); or the like. A root node of the tree root node may be associated with a current time and/or the most recent sensor data or batch of sensor data. As such, the root node may be associated with perception data that may or may not include prediction data. In other words, the root node may identify environment state data that includes a current position, orientation, velocity, acceleration, classification, etc. of static and/or dynamic objects (including similar information for the vehicle, which may be generated by the localization component of the vehicle) in the environment and may additionally or alternatively include historical data of the same. In other words, the root node may identify a current environment state.

Predictions of how the object(s) will behave in the future, correspondingly how this data will change in the future, may be associated with the prediction node(s) discussed herein and, in some examples, the prediction data for a current time step may be associated with the root node. In other words, the root node may include the current state of the environment, including the object(s) therein, localization data related to the vehicle (e.g., determined by SLAM), and/or prediction data identifying one or more possible future states of the environment, which may include a position, orientation, velocity, acceleration, classification, etc. of an object associated with a future time. For example, a prediction associated with an object may include a predicted action determined by example process 400.

At operation 516, example process 500 may include determining a branch to explore from multiple branches of the tree search based at least in part on the reflexive predicted action. For example, a branch may indicate a link between a current or predicted environment state and an action taken by the vehicle that may result in a next environment state. After determining the tree by the planning component, example process 500 may determine a branch from one or more sibling branches in the tree to perform further exploration based at least in part on the reflexive predicted action. For example, based on information (such as the predicted velocity, the predicted position, etc.) indicated by the reflexive predicted action in association with the autonomous vehicle, example process 500 may determine a branch/candidate trajectory that is most similar to the reflexive predicted action to explore. In other words, the tree search algorithm may output a state node of the tree to the ML component as input to the ML component. The state node of the tree may indicate a current or predicted environment state, depending on how deep the node is in the tree. The ML component may output a reflexive predicted action based at least in part on the state node. That reflexive predicted action may be received by the tree search algorithm and the tree search algorithm may use the reflexive predicted action itself to update the tree (e.g., the reflexive predicted action may be used as a next action node or branch) or may determine a branch or action node of the tree that is most similar to the reflexive predicted action. Using the reflexive predicted action or identifying an action node that identifies an action that is most similar to the reflexive predicted action to explore the tree may include determining a new predicted state of the environment that would result by implementing the reflexive predicted action or most-similar action. This process may be repeated until a target location is reached.

At operation 518, example process 500 may include determining a trajectory to control the real-world vehicle based at least in part on the branch determined at operation 516. For example, example process 500 may include tracing a path from a root node to an end node, including traversing the tree using the branch that has been determined at operation 516.

Example Architecture

Figure 6:
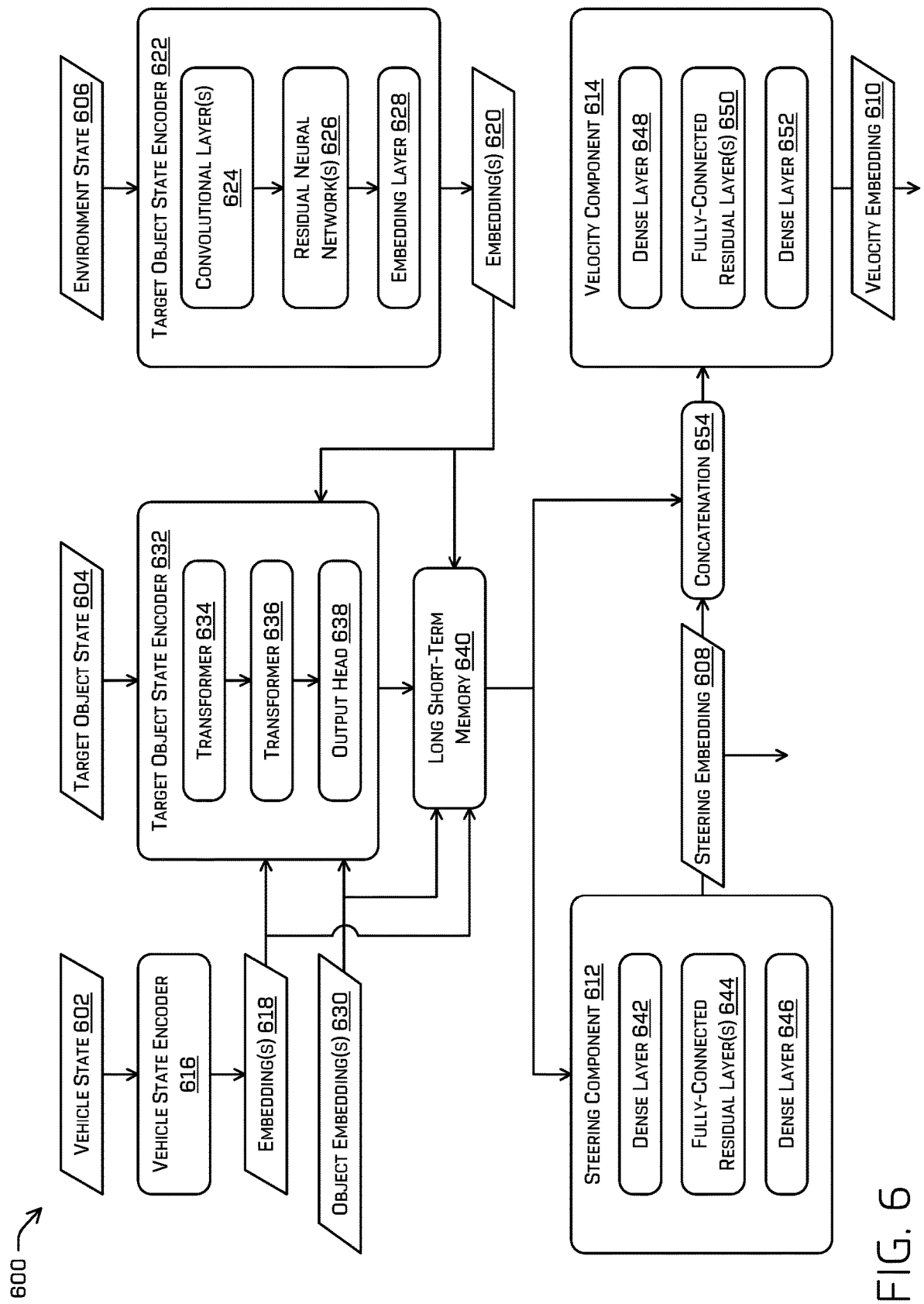
FIG. 6 illustrates a block diagram of an example architecture of the ML component discussed herein and/or as trained as discussed herein.

FIG. 6 illustrates an example architecture 600 of the ML component 232 discussed herein. The depicted example architecture 600 receives three inputs, a vehicle state 602, target object state 604, and/or environment state 606, which may be used by the example architecture 600 to determine a predicted action associated with the target object. The predicted action may comprise one or more components. The illustrated example includes a predicted action that comprises a steering output, steering embedding 608, and a velocity output, velocity embedding 610. Depending on the stage of training the target object may be a vehicle other than the autonomous vehicle (i.e., for the first stage of training) or the autonomous vehicle itself (i.e., for the second stage of training or in real-world or simulated use, such as part of a tree search and/or for ranking and/or weighting candidate trajectories. As discussed herein, however, it is understood that the ML component 232 may output less, additional, or alternate outputs, which may require reconfiguration of the last stage of the example architecture 600, steering component 612 and velocity component 614.

In some examples, the vehicle state 602 may include sensor data and/or perception data associated with a current state of the vehicle that is being trained/controlled. In some examples, in the first stage of training, the vehicle state 602 may not be used. In an additional or alternate example, the vehicle state 602 may be used. The vehicle state 602 may include a steering angle (e.g., heading of the vehicle, steering rate, wheel steering angle), a velocity of the vehicle, and/or a speed limit associated with the vehicle. In some examples, this data may be concatenated into a single vector and/or may be represented as different data structures. For example, the steering data may be represented by a 256-bit one-hot vector, velocity may be represented by a 256-bit one-hot vector, and/or the speed limit may be represented by a data structure that includes a binary indication of whether a speed limit is present and/or a speed, as a float or other value. Other data structures are contemplated.

In some examples, the target object state 604 may be associated with the object for which a prediction is being determined—another vehicle in the first stage of training and the autonomous vehicle itself during the second stage of training and/or during real/simulated operation of the vehicle, in some examples. The target object state 604 may include a data structure comprising an object position, width and/or height of the object, a yaw indicating a heading of the vehicle, a classification associated with the vehicle (e.g., pedestrian, vehicle, cyclist, unknown), a velocity direction of the object, a velocity magnitude, a confidence that the object is moving (e.g., a number between 0 and 1, which may be determined by the perception component, in some examples), whether the object is on a roadway, and/or the like. The data structure may include additional or alternate data and may comprise binary indications, vector(s), tensor(s), binary indications, etc.

In some examples, the environment state 606 may include a data structure representing a state of the environment in which the target object is located. For example, the environment state 606 may include a top-down representation of the environment, which may include indications of the location and/or space occupied by static and/or dynamic objects; object track(s); traffic light states; roadway, sidewalk, crosswalk, etc. location(s); etc. In such an example, the environment state 606 could be a 128-by-128 8-channel data structure associated with a top down representation of an 100 meter by 100 meter area, although additional or alternate resolution, number of channels, and/or distance represented are contemplated.

A vehicle state encoder 616 may transform the vehicle state 602 into one or more embeddings, embedding(s) 618. For example, the vehicle state encoder 616 may comprise an embedding model, such as t-distributed stochastic neighbor embedding (t-SNE), uniform manifold approximation and projection (UMAP), pairwise controlled manifold approximation projection (PaCMAP), TriMap, or the like that determines embedding(s) 618 that represent the vehicle state 602 in an embedding space. In some examples, the embedding space may be different than an embedding space associated with embedding(s) 620 determined by a target object state encoder 622. In some examples, each portion of the vehicle state 602 may be projected to its own embedding in a same or different embedding space than the other embeddings. For example, where the vehicle state 602 indicates three features (e.g., steering angle, velocity, speed limit), three embeddings may be determined. The dimensionality of the embeddings may be less than the respective features each embedding is associated with. In yet another example, a single embedding may be determined that represents the totality of the vehicle state 602.

In some examples, the target object state encoder 622 may determine one or more embedding(s) 620 to represent the environment state 606 in an embedding space that may be the same or different than an embedding spaces associated with embedding(s) 618. In some examples, the embedding spaces may be different. In some examples, the target object state encoder 622 may comprise one or more convolutional layers, convolutional layer(s) 624. For example, the convolutional layer(s) 624 may comprise 1, 2, 3, 4, or more layer(s) of convolutional neural networks and/or convolutional kernels that rescale the environment state 606 while actuating activation functions of the convolutional layer(s) 624, based at least in part on a training thereof. The output of each respective convolutional layer may be output to any next convolutional layer as input until the last convolutional layer determines an output that is provided to one or more residual neural network(s) (ResNet(s)) 626. For example, two ResNets, in series, may process the output generated by the convolutional layer(s) 624. This processing by the ResNet(s) may flatten the output from the convolutional layer(s) 624. For example, where four convolutional layers are used and where the environment state is 128-by-128 and 8-channels, the final output from the convolutional layer(s) 624 may be a 16×16×32 three-dimensional field of actuations. Two ResNet(s) may flatten this output into an 1,892-dimensional vector.

Regardless of the number of ResNet(s), the output therefrom may be provided to an embedding layer 628. The embedding layer 628 may be a fully connected neural network layer that projects the vector output by the ResNet(s) to a lower dimension. Taking the example given above and depending on the dimensionality of the environment state 606 and the configuration of the target object state encoder 624, the embedding layer 628 may project the 1,892-dimensional vector into an embedding space, associating the 1,892-dimensional vector with a 100-dimensional embedding in the embedding space, to give an example. Any other number is contemplated, however, as this dimension may depend on chosen hyperparameters. In at least one example, embedding layer 628 may be a neural network dense layer.

Similar to the vehicle state encoder 616, object embedding(s) 630 of the nearest n number of objects (e.g., static and/or dynamic objects where n is a positive integer) to the target object may be determined by an encoder similar to vehicle state encoder 616, but trained for embedding object locations and/or movement. For example, the object embedding(s) 630 may indicate, representations in an embedding space, of the location(s) and/or movement of other object(s) in the environment, such as the nearest 10, 50, 120, 200, or any other number of objects. In some examples, different embeddings may be determined for each object and may be concatenated or stored in a data structure with entries for each embedding or for each object type (e.g., the data structure may have different portions for different object classifications).

The embedding(s) 618 associated with the vehicle state 602, the embedding(s) 620 associated with the environment state 606, the target object state 604, and/or object embedding(s) 630 may be provided as input to a target object state encoder 632. In some examples, the target object state encoder 624 may include one or more transformers. For example, FIG. 6 includes two transformers, transformer 634 and transformer 636, although more or less transformers may be used. The transformers may have a number of key vectors equal to the number of nearest objects represented by the object embedding(s) 630, plus the number of embedding(s) 618 and embedding(s) 620. In some examples, the transformers may be dual-head transformers and may include a number of hidden nodes equal to or double the number of key vectors and/or may have a number of outputs equal to the number of key vectors.

The transformers may be trained to weight the significance of the various input features, e.g., whether a static object location, velocity, or the like; dynamic object position, velocity, or the like; object classification; traffic signal state; roadway shape; vehicle position, target object position or velocity; or the like will play an important role in the action taken by the target object and/or how important such a role may be respective to all the other features. This significance is a prediction that may be trained based at least in part on the first and/or stages of training as discussed herein. Note that the components discussed in regard to FIG. 6 may be altered as a part of training according to the first and/or second stages of training discussed herein. In other words, the discussion above about altering the ML component includes altering any of the components or sub-components discussed regarding FIG. 6. The output of the final transformer may be processed by an output head 638 that may determine a mean across the different features and/or objects, the number of which may be equal to the number of key vectors.

The output of the target object state encoder 632 may be provided as input to a long short-term memory (LSTM) 640, along with embedding(s) 618, object embedding(s) 630, and/or embedding(s) 620. The LSTM may determine output(s) according to what features are included as part of the predicted action. For example, the illustrated example includes a predicted action that includes predicting a steering and velocity portion of a predicted action associated with the target object. The LSTM 640 may output a respective output to each of a steering component 612 and a velocity component 614. The output from the LSTM to the velocity component 614 may be concatenated to an output from the steering component 612 (i.e., steering embedding 608) since steering and velocity are correlated output terms.

The steering component 612 and velocity component 614 may each include different dense layers and full-connected residual layer(s). For example, steering component 612 may include dense layer 642, full-connected residual layer(s) 644, and dense layer 646 and velocity component 614 may include dense layer 648, fully-connected residual layer(s) 650, and embedding layer 652. Dense layers 642, 646, 648, and 652 may each be different neural network dense layers that include neurons that are fully connected to the previous component. The fully-connected residual layer(s) 644 may include one or more fully-connected neural network blocks with skips between blocks. In some examples, 2, 3, or more residual layers may be used. In at least one example, three residual blocks may be used with two skip connections.

In some examples, the final output from the steering output, steering embedding 608, may be an embedding that may result from a fully-connected output head from dense layer 646. Steering embedding 608 may represent a steering condition, such as a heading and/or steering rate. Dense layer 646 may project an output from the last fully-connected residual layer 644 into an embedding space. The steering embedding 608 may be provided as output to a planning component and/or may be concatenated, at a concatenation component 654, to an output of the LSTM 640 associated with velocity. The velocity component 614 may conduct similar operations as the steering component 612 on the velocity output of the LSTM 640 and/or velocity-steering concatenated data, although the steering component 612 and the velocity component 614 may be altered separately during training. The velocity component 614 may thereby determine a velocity embedding 610, which may be output to the planning component.

Example Clauses

A. A method comprising: receiving log data including at least one of sensor data associated with a first time or perception data associated with the first time and determined based at least in part on the sensor data, and an action taken by a target vehicle at a second time after the first time; in a first training stage, receiving, from a machine-learned (ML) component, a predicted action associated with the target vehicle, wherein the ML component determines the predicted action based at least in part on at least one of the sensor data or the perception data; in the first training stage, modifying the ML component to reduce a difference between the predicted action and the action taken by the target vehicle; in a second training stage subsequent to the first training stage, controlling a vehicle based at least in part on output of the ML component; in the second training stage, determining a reward associated with a performance of the vehicle while the vehicle was controlled based at least in part on the output of the ML component; in the second training stage, modifying the ML component based at least in part on the reward; and transmitting the ML component to another vehicle, wherein operation of the other vehicle is based at least in part on executing the ML component.

B. The method of paragraph A, further comprising: receiving second sensor data; determining, based at least in part on the second sensor data, one or more candidate trajectories; determining, by the ML component and based at least in part on the second sensor data or state data determined based at least in part on the second sensor data, a reflexive predicted action, wherein the reflexive predicted action identifies a prediction of an action to be taken by a system that receives the second sensor data; determining, based at least in part on the reflexive predicted action, at least one of a ranking of the one or more candidate trajectories or a weight associated with a first candidate trajectory of the one or more candidate trajectories; and determining a trajectory based at least in part on at least one of the ranking or the weight.

C. The method of either paragraph A or B, further comprising: receiving second sensor data; determining, by the ML component and based at least in part on the sensor data, a reflexive predicted action, wherein the reflexive predicted action identifies a prediction of an action to be taken by a system that receives the second sensor data; and determining, based at least in part on the reflexive predicted action, a branch, from among multiple branches of a tree search, to explore, the tree search being executed to generate a candidate trajectory to control the real-world vehicle.

D. The method of any one of paragraphs A-C, wherein the ML component comprises a long short-term memory component that provides output to a machine-learning block comprising a transformer, wherein the machine-learning block determines at least part of the predicted action.

E. The method of paragraph D, further comprising: determining, based at least in part on the log data, a first embedding associated with a first state of an object in an environment associated with the target vehicle; determining, based at least in part on the log data and by one or more transformers, a second embedding associated with a second state of the target vehicle, wherein the second embedding is further based on the first embedding; and providing, as input to the long short-term memory component, the first embedding and the second embedding.

F. The method of any one of paragraphs A-E, wherein the perception data includes a state that comprises at least one of map data or perception data indicating an object detection.

G. A system comprising: one or more processors; and a memory storing processor-executable instructions that, when executed by one or more processors, cause the one or more processors to perform operations comprising: receiving log data including an environment state associated with a first time and an action taken by a target vehicle at a second time after the first time. Wherein the environment state comprises at least one of sensor data associated with a first time or perception data associated with the first time; in a first training stage, receiving, from a machine-learned (ML) component, a predicted action associated with the target vehicle, wherein the ML component determines the predicted action based at least in part on the environment state; in the first training stage, modifying the ML component to reduce a difference between the predicted action and the action taken by the target vehicle; in a second training stage subsequent to the first training stage, controlling a vehicle based at least in part on an output determined by the ML component; in the second training stage, determining a reward associated with a performance of the vehicle while the vehicle was controlled based at least in part on the output of the ML component; in the second training stage, modifying the ML component based at least in part on the reward; and transmitting the ML component to another vehicle, wherein operation of the other vehicle is based at least in part on executing the ML component.

H. The system of paragraph G, wherein the operations further comprise: receiving second sensor data; determining, based at least in part on the second sensor data, one or more candidate trajectories; determining, by the ML component and based at least in part on the second sensor data or state data determined based at least in part on the second sensor data, a reflexive predicted action, wherein the reflexive predicted action identifies a prediction of an action to be taken by a system that receives the second sensor data; determining, based at least in part on the reflexive predicted action, at least one of a ranking of the one or more candidate trajectories or a weight associated with a first candidate trajectory of the one or more candidate trajectories; and determining a trajectory based at least in part on at least one of the ranking or the weight.

I. The system of either paragraph G or H, wherein the operations further comprise: receiving second sensor data; determining, by the ML component and based at least in part on the sensor data, a reflexive predicted action, wherein the reflexive predicted action identifies a prediction of an action to be taken by a system that receives the second sensor data; and determining, based at least in part on the reflexive predicted action, a branch, from among multiple branches of a tree search, to explore, the tree search being executed to generate a candidate trajectory to control the real-world vehicle.

J. The system of any one of paragraphs G-I, wherein the ML component comprises a long short-term memory component that provides output to a machine-learning block comprising a transformer, wherein the machine-learning block determines at least part of the predicted action.

K. The system of any one of paragraphs G-J, wherein the operations further comprise: determining, based at least in part on the log data, a first embedding associated with a first state of an object in an environment associated with the target vehicle; determining, based at least in part on the log data and by one or more transformers, a second embedding associated with a second state of the target vehicle, wherein the second embedding is further based on the first embedding; and providing, as input to the long short-term memory component, the first embedding and the second embedding.

L. The system of any one of paragraphs G-K, wherein modifying the ML component to reduce the difference between the predicted action and the action taken by the target vehicle and modifying the ML component based at least in part on the reward includes modifying two or more of sub-components of the ML component, the sub-components comprising at least two of: a long short-term memory, one or more transformers, or one or more embedding models.

M. The system of any one of paragraphs G-L, wherein the environment state further includes at least one of map data or perception data indicating an object detection.

N. A non-transitory computer-readable medium storing processor-executable instructions that, when executed by one or more processors, causes the one or more processors to perform operations comprising: receiving log data including an environment state associated with a first time and an action taken by a target vehicle at a second time after the first time. Wherein the environment state comprises at least one of sensor data associated with a first time or perception data associated with the first time; in a first training stage, receiving, from a machine-learned (ML) component, a predicted action associated with the target vehicle, wherein the ML component determines the predicted action based at least in part on the environment state; in the first training stage, modifying the ML component to reduce a difference between the predicted action and the action taken by the target vehicle; in a second training stage subsequent to the first training stage, controlling a vehicle based at least in part on an output determined by the ML component; in the second training stage, determining a reward associated with a performance of the vehicle while the vehicle was controlled based at least in part on the output of the ML component; in the second training stage, modifying the ML component based at least in part on the reward; and transmitting the ML component to another vehicle, wherein operation of the other vehicle is based at least in part on executing the ML component.

O. The non-transitory computer-readable medium of paragraph N, wherein the operations further comprise: receiving second sensor data; determining, based at least in part on the second sensor data, one or more candidate trajectories; determining, by the ML component and based at least in part on the second sensor data or state data determined based at least in part on the second sensor data, a reflexive predicted action, wherein the reflexive predicted action identifies a prediction of an action to be taken by a system that receives the second sensor data; determining, based at least in part on the reflexive predicted action, at least one of a ranking of the one or more candidate trajectories or a weight associated with a first candidate trajectory of the one or more candidate trajectories; and determining a trajectory based at least in part on at least one of the ranking or the weight.

P. The non-transitory computer-readable medium of either paragraph N or O, wherein the operations further comprise: receiving second sensor data; determining, by the ML component and based at least in part on the sensor data, a reflexive predicted action, wherein the reflexive predicted action identifies a prediction of an action to be taken by a system that receives the second sensor data; and determining, based at least in part on the reflexive predicted action, a branch, from among multiple branches of a tree search, to explore, the tree search being executed to generate a candidate trajectory to control the real-world vehicle.

Q. The non-transitory computer-readable medium of any one of paragraphs N-P, wherein the ML component comprises a long short-term memory component that provides output to a machine-learning block comprising a transformer, wherein the machine-learning block determines at least part of the predicted action.

R. The non-transitory computer-readable medium of any one of paragraphs N-Q, wherein the operations further comprise: determining, based at least in part on the log data, a first embedding associated with a first state of an object in an environment associated with the target vehicle; determining, based at least in part on the log data and by one or more transformers, a second embedding associated with a second state of the target vehicle, wherein the second embedding is further based on the first embedding; and providing, as input to the long short-term memory component, the first embedding and the second embedding.

S. The non-transitory computer-readable medium of any one of paragraphs N-R, wherein modifying the ML component to reduce the difference between the predicted action and the action taken by the target vehicle and modifying the ML component based at least in part on the reward includes modifying two or more of sub-components of the ML component, the sub-components comprising at least two of: a long short-term memory, one or more transformers, or one or more embedding models.

T. The non-transitory computer-readable medium of any one of paragraphs N-S, wherein the environment state further includes at least one of map data or perception data indicating an object detection.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
receiving log data including at least one of sensor data associated with a first time or perception data associated with the first time and determined based at least in part on the sensor data, and an action taken by a target vehicle at a second time after the first time;

in a first training stage, receiving, from a machine-learned (ML) component, a predicted action associated with the target vehicle, wherein the ML component determines the predicted action based at least in part on at least one of the sensor data or the perception data;

in the first training stage, modifying the ML component to reduce a difference between the predicted action and the action taken by the target vehicle;

in a second training stage subsequent to the first training stage, controlling a vehicle based at least in part on output of the ML component determined based at least in part on data associated with the vehicle;

in the second training stage, determining a reward associated with a performance of the vehicle while the vehicle was controlled based at least in part on the output of the ML component;

in the second training stage, modifying the ML component based at least in part on the reward; and transmitting the ML component to another vehicle, wherein operation of the other vehicle is based at least in part on executing the ML component.

2. The method of claim 1, further comprising:
receiving second sensor data;
determining, based at least in part on the second sensor data, one or more candidate trajectories;
determining, by the ML component and based at least in part on the second sensor data or state data determined based at least in part on the second sensor data, a reflexive predicted action, wherein the reflexive predicted action identifies a prediction of an action to be taken by a system that receives the second sensor data;
determining, based at least in part on the reflexive predicted action, at least one of a ranking of the one or more candidate trajectories or a weight associated with a first candidate trajectory of the one or more candidate trajectories; and
determining a trajectory based at least in part on at least one of the ranking or the weight.

3. The method of claim 1, further comprising:
receiving second sensor data;
determining, by the ML component and based at least in part on the sensor data, a reflexive predicted action, wherein the reflexive predicted action identifies a prediction of an action to be taken by a system that receives the second sensor data; and
determining, based at least in part on the reflexive predicted action, a branch, from among multiple branches of a tree search, to explore, the tree search being executed to generate a candidate trajectory to control the other vehicle.

4. The method of claim 1, wherein the ML component comprises a long short-term memory component that provides output to a machine-learning block comprising a transformer, wherein the machine-learning block determines at least part of the predicted action.

5. The method of claim 4, further comprising:
determining, based at least in part on the log data, a first embedding associated with a first state of an object in an environment associated with the target vehicle;
determining, based at least in part on the log data and by one or more transformers, a second embedding associated with a second state of the target vehicle, wherein the second embedding is further based on the first embedding; and providing, as input to the long short-term memory component, the first embedding and the second embedding.

6. The method of claim 1, wherein the perception data includes a state that comprises at least one of map data or perception data indicating an object detection.

7. A system comprising:
one or more processors; and
a memory storing processor-executable instructions that, when executed by one or more processors, cause the one or more processors to perform operations comprising:
receiving log data including an environment state associated with a first time and an action taken by a target vehicle at a second time after the first time, wherein the environment state comprises at least one of sensor data associated with a first time or perception data associated with the first time;
in a first training stage, receiving, from a machine-learned (ML) component, a predicted action associated with the target vehicle, wherein the ML component determines the predicted action based at least in part on the environment state;
in the first training stage, modifying the ML component to reduce a difference between the predicted action and the action taken by the target vehicle;
in a second training stage subsequent to the first training stage, controlling a vehicle based at least in part on an output determined by the ML component;
in the second training stage, determining a reward associated with a performance of the vehicle while the vehicle was controlled based at least in part on the output of the ML component;
in the second training stage, modifying the ML component based at least in part on the reward; and
transmitting the ML component to another vehicle, wherein operation of the other vehicle is based at least in part on executing the ML component.

8. The system of claim 7, wherein the operations further comprise:
receiving second sensor data;
determining, based at least in part on the second sensor data, one or more candidate trajectories;
determining, by the ML component and based at least in part on the second sensor data or state data determined based at least in part on the second sensor data, a reflexive predicted action, wherein the reflexive predicted action identifies a prediction of an action to be taken by a system that receives the second sensor data;
determining, based at least in part on the reflexive predicted action, at least one of a ranking of the one or more candidate trajectories or a weight associated with a first candidate trajectory of the one or more candidate trajectories; and
determining a trajectory based at least in part on at least one of the ranking or the weight.

9. The system of claim 7, wherein the operations further comprise:
receiving second sensor data;
determining, by the ML component and based at least in part on the sensor data, a reflexive predicted action, wherein the reflexive predicted action identifies a prediction of an action to be taken by a system that receives the second sensor data; and
determining, based at least in part on the reflexive predicted action, a branch, from among multiple branches of a tree search, to explore, the tree search being executed to generate a candidate trajectory to control the other vehicle.

10. The system of claim 7, wherein the ML component comprises a long short-term memory component that provides output to a machine-learning block comprising a transformer, wherein the machine-learning block determines at least part of the predicted action.

11. The system of claim 10, wherein the operations further comprise:
determining, based at least in part on the log data, a first embedding associated with a first state of an object in an environment associated with the target vehicle;
determining, based at least in part on the log data and by one or more transformers, a second embedding associated with a second state of the target vehicle, wherein the second embedding is further based on the first embedding; and
providing, as input to the long short-term memory component, the first embedding and the second embedding.

12. The system of claim 7, wherein modifying the ML component to reduce the difference between the predicted action and the action taken by the target vehicle and modifying the ML component based at least in part on the reward includes modifying two or more of sub-components of the ML component, the sub-components comprising at least two of:
a long short-term memory,
one or more transformers, or
one or more embedding models.

13. The system of claim 7, wherein the environment state further includes at least one of map data or perception data indicating an object detection.

14. A non-transitory computer-readable medium storing processor-executable instructions that, when executed by one or more processors, causes the one or more processors to perform operations comprising:
receiving log data including an environment state associated with a first time and an action taken by a target vehicle at a second time after the first time, wherein the environment state comprises at least one of sensor data associated with a first time or perception data associated with the first time;
in a first training stage, receiving, from a machine-learned (ML) component, a predicted action associated with the target vehicle, wherein the ML component determines the predicted action based at least in part on the environment state;
in the first training stage, modifying the ML component to reduce a difference between the predicted action and the action taken by the target vehicle;
in a second training stage subsequent to the first training stage, controlling a vehicle based at least in part on an output determined by the ML component;
in the second training stage, determining a reward associated with a performance of the vehicle while the vehicle was controlled based at least in part on the output of the ML component;
in the second training stage, modifying the ML component based at least in part on the reward; and
transmitting the ML component to another vehicle, wherein operation of the other vehicle is based at least in part on executing the ML component.

15. The non-transitory computer-readable medium of claim 14, wherein the operations further comprise:
receiving second sensor data;
determining, based at least in part on the second sensor data, one or more candidate trajectories;
determining, by the ML component and based at least in part on the second sensor data or state data determined based at least in part on the second sensor data, a reflexive predicted action, wherein the reflexive predicted action identifies a prediction of an action to be taken by a system that receives the second sensor data;
determining, based at least in part on the reflexive predicted action, at least one of a ranking of the one or more candidate trajectories or a weight associated with a first candidate trajectory of the one or more candidate trajectories; and
determining a trajectory based at least in part on at least one of the ranking or the weight.

16. The non-transitory computer-readable medium of claim 14, wherein the operations further comprise:
receiving second sensor data;
determining, by the ML component and based at least in part on the sensor data, a reflexive predicted action, wherein the reflexive predicted action identifies a prediction of an action to be taken by a system that receives the second sensor data; and
determining, based at least in part on the reflexive predicted action, a branch, from among multiple branches of a tree search, to explore, the tree search being executed to generate a candidate trajectory to control the other real world vehicle.

17. The non-transitory computer-readable medium of claim 14, wherein the ML component comprises a long short-term memory component that provides output to a machine-learning block comprising a transformer, wherein the machine-learning block determines at least part of the predicted action.

18. The non-transitory computer-readable medium of claim 17, wherein the operations further comprise:
determining, based at least in part on the log data, a first embedding associated with a first state of an object in an environment associated with the target vehicle;
determining, based at least in part on the log data and by one or more transformers, a second embedding associated with a second state of the target vehicle, wherein the second embedding is further based on the first embedding; and
providing, as input to the long short-term memory component, the first embedding and the second embedding.

19. The non-transitory computer-readable medium of claim 14, wherein modifying the ML component to reduce the difference between the predicted action and the action taken by the target vehicle and modifying the ML component based at least in part on the reward includes modifying two or more of sub-components of the ML component, the sub-components comprising at least two of:
a long short-term memory,
one or more transformers, or
one or more embedding models.

20. The non-transitory computer-readable medium of claim 14, wherein the environment state further includes at least one of map data or perception data indicating an object detection.

* * * * *